US010523555B2

(12) United States Patent
Gibbings

(10) Patent No.: US 10,523,555 B2
(45) Date of Patent: *Dec. 31, 2019

(54) MULTI-ROUTER IGP FATE SHARING

(71) Applicant: LEVEL 3 COMMUNICATIONS, LLC, Broomfield, CO (US)

(72) Inventor: Christopher J. Gibbings, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,421

(22) Filed: Mar. 19, 2018

(65) Prior Publication Data

US 2018/0254975 A1    Sep. 6, 2018

Related U.S. Application Data

(63) Continuation of application No. 15/427,855, filed on Feb. 8, 2017, now Pat. No. 9,923,804, which is a continuation of application No. 13/526,352, filed on Jun. 18, 2012, now abandoned, which is a
(Continued)

(51) Int. Cl.
*H04L 12/721* (2013.01)
*H04L 12/701* (2013.01)
*H04L 12/709* (2013.01)
*H04L 12/703* (2013.01)

(52) U.S. Cl.
CPC ............ *H04L 45/123* (2013.01); *H04L 45/00* (2013.01); *H04L 45/12* (2013.01); *H04L 45/245* (2013.01); *H04L 45/28* (2013.01)

(58) Field of Classification Search
CPC .......... H04L 45/10; H04L 45/22; H04L 45/42
See application file for complete search history.

(56) References Cited

U.S. PATENT DOCUMENTS

| 6,765,910 B1 | 7/2004 | Johnson |
| 6,857,026 B1 | 2/2005 | Cain |
| 7,266,123 B1 | 9/2007 | Johnson et al. |

(Continued)

FOREIGN PATENT DOCUMENTS

WO    WO-2004062208    7/2004

OTHER PUBLICATIONS

Canadian Examination Report, dated Jul. 25, 2014, Application No. 2,724,578, filed May 19, 2009; 2 pgs.
(Continued)

*Primary Examiner* — Melanie Jagannathan

(57) ABSTRACT

A method for routing communication traffic in a network includes detecting that a link in a parallel link configuration has failed and, in response, adjusting one or more metrics associated with other links in the parallel link configuration to indicate that none of the links in the parallel configuration are available. A router connected to a direct link in a parallel link configuration including one or more other routers connected to one or more indirect links, respectively, includes a memory storing configuration parameters specifying a minimum number of links required to be operational in the parallel link configuration and an artificially high cost, and a link metric adjustment module operable to set a metric of the direct link to the artificially high cost until the minimum number of required links are operational after startup of the router or failure and reactivation of the direct link.

3 Claims, 9 Drawing Sheets

Related U.S. Application Data continuation of application No. 12/125,478, filed on May 22, 2008, now Pat. No. 8,203,938.

(56) References Cited

U.S. PATENT DOCUMENTS

| | | |
|---|---|---|
| 7,602,726 B1 | 10/2009 | Sundaresan et al. |
| 8,103,789 B1 | 1/2012 | Der-Hwa |
| 2004/0117251 A1 | 6/2004 | Charles Shand |
| 2007/0047469 A1 | 3/2007 | Vasseur |
| 2007/0263532 A1 | 11/2007 | Mirtorabi et al. |
| 2009/0187795 A1 | 7/2009 | Doverspike et al. |
| 2009/0290497 A1 | 11/2009 | Gibbings |
| 2012/0327765 A1 | 12/2012 | Gibbings |
| 2017/0149649 A1 | 5/2017 | Gibbings |

OTHER PUBLICATIONS

Canadian Examination Report, dated Jul. 4, 2013, Application No. 2724578; 2 pgs.

EPO Communication—Result of Consultation, dated Dec. 19, 2013, Application No. 09751379.0, filed May 19, 2009; 5 pgs.

Extended European Search Report, dated Jan. 19, 2013, Application No. 09751379.0, 11 pgs.

International Search Report, dated Dec. 29, 2009, PCT/US09/044514, Intl filing date May 19, 2009, 3 pgs.

Written Opinion, dated Dec. 29, 2009, PCT/US09/044514, Intl filing date May 19, 2009, 5 pgs.

Fortz, Bernard et al., "Robust Optimization of OSPF/IS-IS Weights", Internet citation XP007901238, http://www.poms.ucl.ac.be/staff/bf/en/inoc.pdf, retrieved from Internet Oct. 23, 2006 2003 , 6 pgs.

Shen, Naiming et al., "Calculating IGP Routes Over Traffic Engineering Tunnels", Internet citation XP002240661, http://ardnoc41.canet2.net/mpls/drafts/draft-hsmit-mpls-igp-spf-00.txt, retrieved from Internet May 9, 2003 Dec. 1999 , 6 pgs.

MULTI-ROUTER IGP FATE SHARING

CROSS REFERENCE TO RELATED APPLICATIONS

This application is a continuation of and claims the benefit of priority to U.S. patent application Ser. No. 15/427,855, entitled "MULTI-ROUTER IGP FATE SHARING," filed Feb. 8, 2017, the entire contents of which are fully incorporated by reference herein for all purposes. application Ser. No. 15/427,855 is a continuation of and claims the benefit of priority to U.S. patent application Ser. No. 13/526,352, entitled "MULTI-ROUTER IGP FATE SHARING," filed Jun. 18, 2012, the entire contents of which are fully incorporated by reference herein for all purposes. application Ser. No. 13/526,352 is a continuation of and claims the benefit of priority to U.S. patent application Ser. No. 12/125,478, entitled "MULTI-ROUTER IGP FATE SHARINNG," filed May 22, 2008 (issued on Jun. 19, 2012 as U.S. Pat. No. 8,203,938), the entire contents of which are fully incorporated by reference herein for all purposes.

BACKGROUND

1. Technical Field

The subject matter discussed herein relates to systems and methods for link fate sharing in multi-router configurations.

2. Description of the Related Art

In communication networks throughout the world, communication traffic is increasing exponentially. Network service providers must constantly upgrade and improve their network infrastructures to compensate for the ever-increasing volume of communication traffic. To transport data across long distances, network links are provided between large metropolitan areas, for example, over a backbone network. One way to compensate for the increase in traffic volume is to add routers at gateways in the metropolitan areas. This can increase the available bandwidth between cities by using similarly sized routers without having to replace existing routers. This has the effect of forming parallel network links between different locations. Because of the way routers typically operate, such parallel configurations can have undesirable consequences if one or more of the links fail.

Network routers share information about the status of links in the network. Interior gateway protocol (IGP) is one example of a protocol for sharing network link information. When Open Shortest Path First (OSPF) or similar protocols are used, routers generally choose the lowest cost link route. If the lowest cost link fails, the routers use the next lowest cost alternative route to avoid the failed link. In parallel configurations, where there are multiple links between pairs of cities, if one of the links fails, routers may begin forcing traffic that would have normally traversed the failed link onto the remaining operational links between the cities.

The remaining operational links can thereby be overwhelmed. For example, in a two-link parallel configuration, if a link fails, all the traffic from the failed link will suddenly be routed onto the remaining functional link. Such a situation effectively eliminates any benefit the extra link provided.

The information included in this Background section of the specification, including any references cited herein and any description or discussion thereof, is included for technical reference purposes only and is not to be regarded subject matter by which the scope of the invention is to be bound.

SUMMARY

An embodiment of a method for routing communication traffic in a network includes detecting that a link in a parallel link configuration has failed and in response to detecting that the link in the parallel link configuration has failed, adjusting one or more metrics associated with other links in the parallel link configuration to indicate that none of the links in the parallel configuration are available. Adjusting the one or more metrics may include increasing the one or more metrics to artificially high values. Adjusting the one or more metrics may include setting the one or more metrics to one or more respective values that reduce the probability of routing communication traffic over the associated one or more links to less than a threshold probability.

In an embodiment of the method adjusting the one or more metrics includes setting at least one of the one or more metrics to a maximum metric minus an adjustment factor that is a function of the number of links in the parallel link configuration. The adjustment factor may be equal to a base adjustment value minus a minimum link number representing a minimum number of normally operational links required in the parallel link configuration. Adjusting the one or more metrics may include setting metrics of all the one or more links to the same value. Adjusting the one or more metrics may include setting the one or more metrics to artificial values different from actual values detected on the one or more other links.

An embodiment of the method may further include detecting that the failed link has become operational and in response to detecting that the failed link has become operational, adjusting an actual metric associated with the link that has become operational to an artificial metric to prevent routing of communication traffic from all other links in the parallel link configuration onto the link that has become operational. The method may further include propagating the adjusted one or more metrics throughout the network. Propagating the adjusted one or more metrics may include advertising the adjusted one or more metrics according to an Interior Gateway Protocol.

Another embodiment of a method for routing data may include detecting that a link has failed in a parallel link configuration, determining whether a minimum number of links in the parallel link configuration are operational, and if the minimum number of links in the parallel link configuration are operational, advertising actual metrics associated with the operational links, and if the minimum number of links in the parallel link configuration are not operational, advertising one or more artificial metrics associated with any remaining operational links in the parallel link configuration.

An embodiment of the method may further include calculating the one or more artificial metrics based on the minimum number of links. The method may still further include configuring each router in the parallel link configuration with the minimum number and identifiers of the routers included in the parallel link configuration. The method may still further include detecting that the failed link has become operational and in response to detecting that the failed link has become operational, advertising an artificial metric before advertising an actual metric associated with the link that has become operational. Advertising an artificial metric before the actual metric may occur to prevent routing of traffic from other links in the parallel link configuration to the previously failed link.

An embodiment of a router connected to a first link in a parallel link configuration including one or more other routers and one or more other links, includes memory storing configuration parameters specifying a minimum number of links required to be operational in the parallel link configuration and an artificially high cost, and a link metric adjustment module operable to set a metric of the first link to the artificially high cost until the minimum number of required links are operational after startup of the router or failure and reactivation of the first link. The router may further include a link status monitor operable to detect failure and reactivation of the first link and notify the link metric adjustment module of the link failure and reactivation. The link status monitor may be further operable to determine if the minimum number of required links are operational.

An embodiment of the may further include an advertising module operable to advertise the first link metric. The configuration parameters may further specify an actual cost of the first link, and wherein the metric adjustment module is further operable to set the first link metric to the actual cost when the minimum number of required links are operational.

Another embodiment of a method carried out by a router in a parallel link configuration in a network, includes advertising an actual metric cost for a metric associated with a link directly connected to the router, detecting failure of the directly connected link, discontinuing advertising the actual metric cost in response to detecting failure of the directly connected link, detecting reactivation of the directly connect link, and advertising an artificially high metric cost until a minimum number of other links in the parallel link configuration are active.

The methods described herein may be carried out by one or more processors executing processor-executable instructions included on a processor-readable medium or media. For example the one or more processors may execute in a computing device, wherein computer storage media (e.g., memory) is communicably coupled to the one or more processors via a communication bus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the present invention will be apparent from the following more particular written description of various embodiments of the invention as further illustrated in the accompanying drawings and defined in the appended claims.

DETAILED DESCRIPTION

Figure 1:
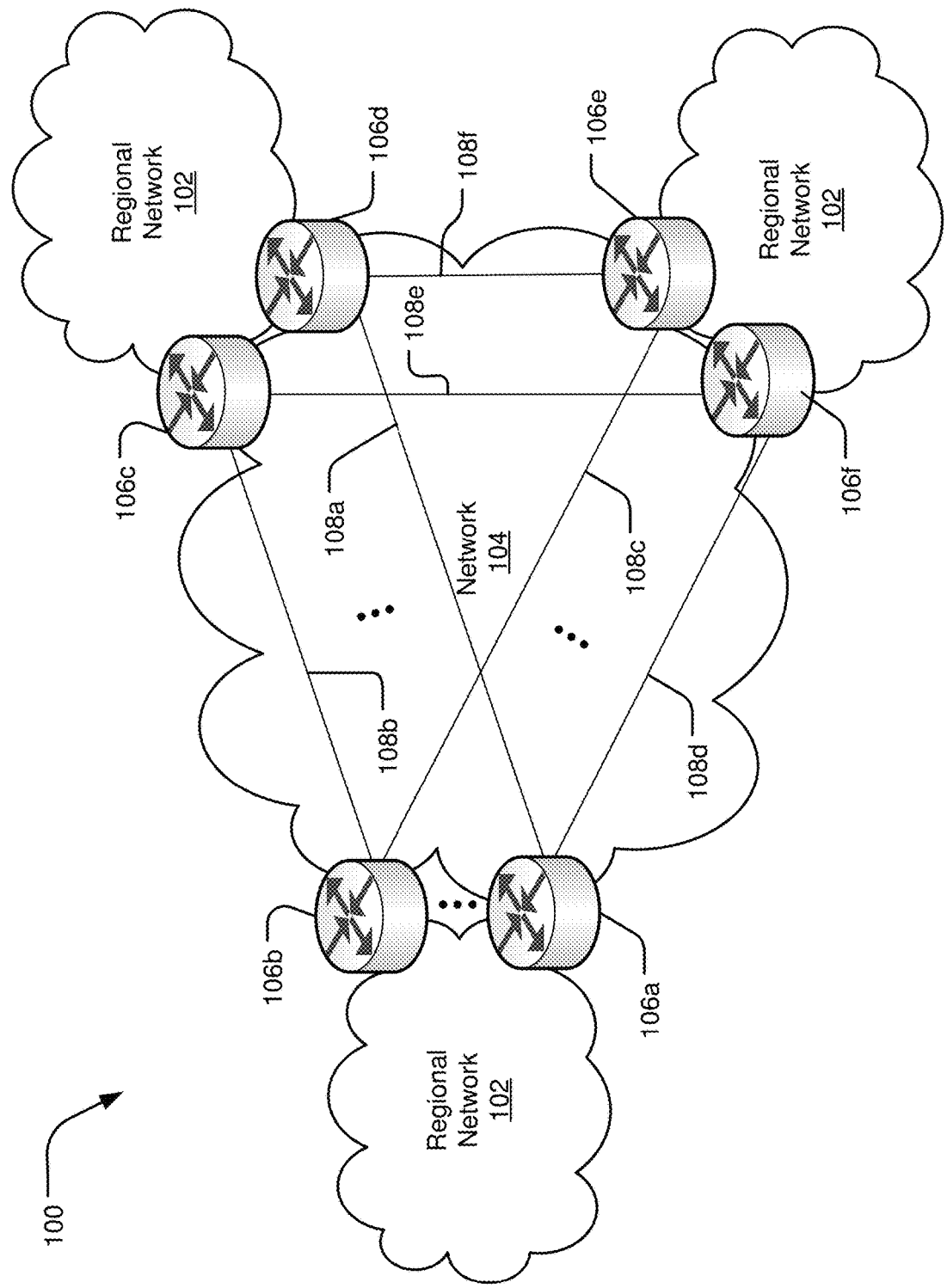
FIG. 1 is a network diagram illustrating an operating environment for systems and methods according to embodiments of the present invention.

FIG. 1 is a network diagram illustrating an operating environment 100 in which various embodiments of systems and methods described herein may be deployed. Multiple regional networks 102 are in communication via another network 104, which may be a backbone network or other network. The regional networks 102 are each generally geographically located near or around cities, such as Chicago, San Jose, London, New York City, or others. The regional networks 102 may correspond to metropolitan area networks, campus area networks, local telephone company networks, or other regional network. One or more of the regional networks 102 and/or network 104 may be composed of multiple sub-networks.

Data communicated to or from the regional networks 102 across network 104 travels through routers, such as routers 106a-106f, referred to collectively as routers 106. Routers 106 may be deployed at respective gateways geographically located near the regional networks 102. Routers 106 may be referred to as edge routers, because of their location with respect to the network 104. However, the systems and methods described herein may be carried out on any routers in a parallel link configuration, discussed further below. Communication links 108a-108f (or simply, "links"), referred to collectively as communication links 108, may each be composed of optical fiber bundles.

Figure 3:
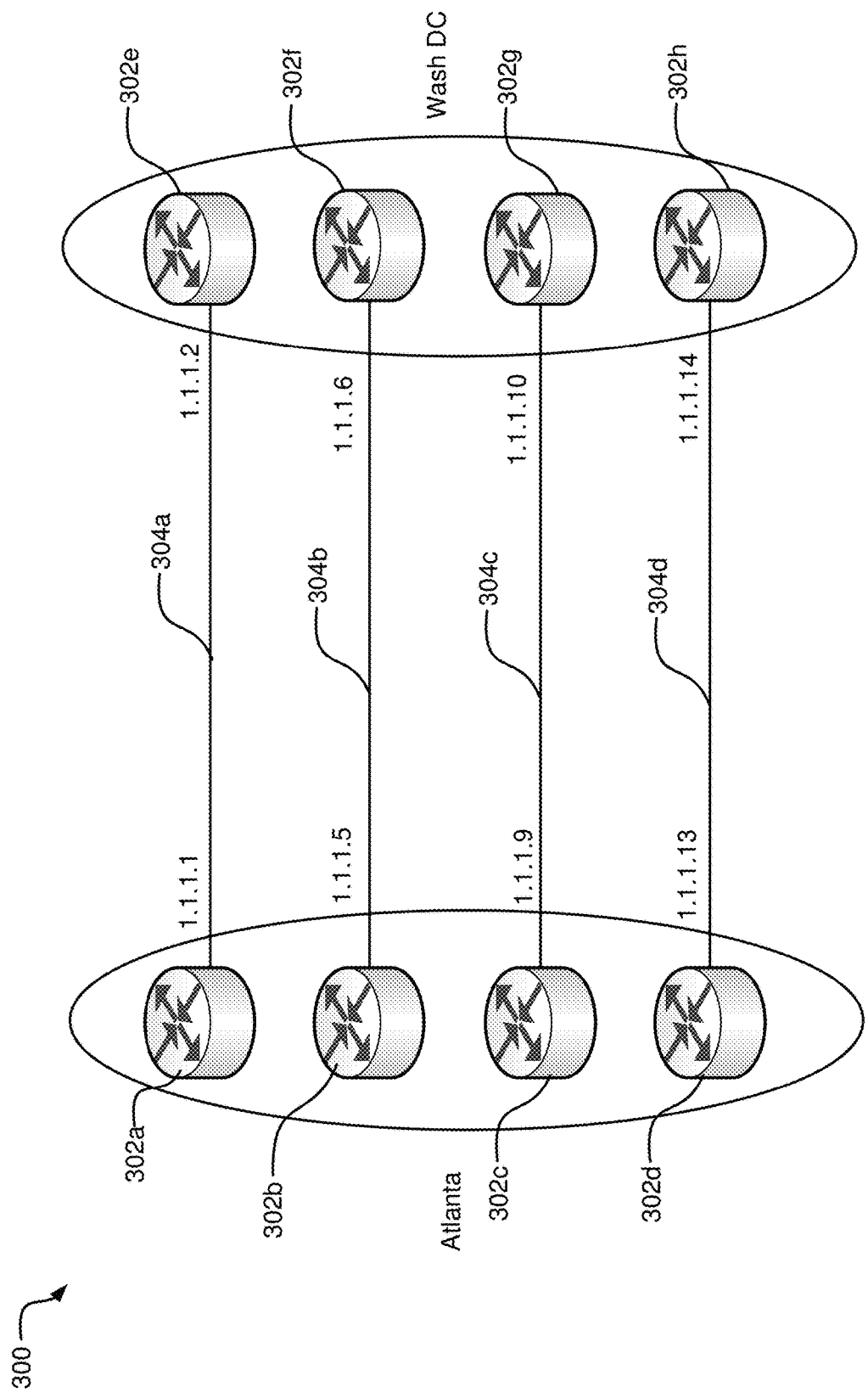
FIG. 3 is a network diagram illustrating another example parallel link configuration.

A parallel link configuration is a group of router sets, where each set of routers includes two or more routers located in a given region, and the routers of each set are communicably linked to respective routers of another set. For example, in FIG. 1 routers 106a, 106b, 106c, 106d and the links 108a, 108b disposed between the routers comprise a parallel link configuration. In such a configuration, communication traffic can be distributed over both links 108a and 108b to be communicated from one region to the other. Although only two routers are shown at each region, there may be more at each region. For example, FIG. 3 shows a parallel link configuration including four routers at each location at ends of the links. In other arrangements, there may be three, five, six or more routers connected at opposite sides in the parallel link configuration.

It is to be understood that the term "parallel" as used in the phrase "parallel link configuration" is not meant in a geometrical sense. As such, the links between routers in a parallel link configuration are not necessarily geometrically parallel. Parallel means that each link in the configuration connects to one of multiple routers in one region and one of multiple routers in another region.

Figure 2:
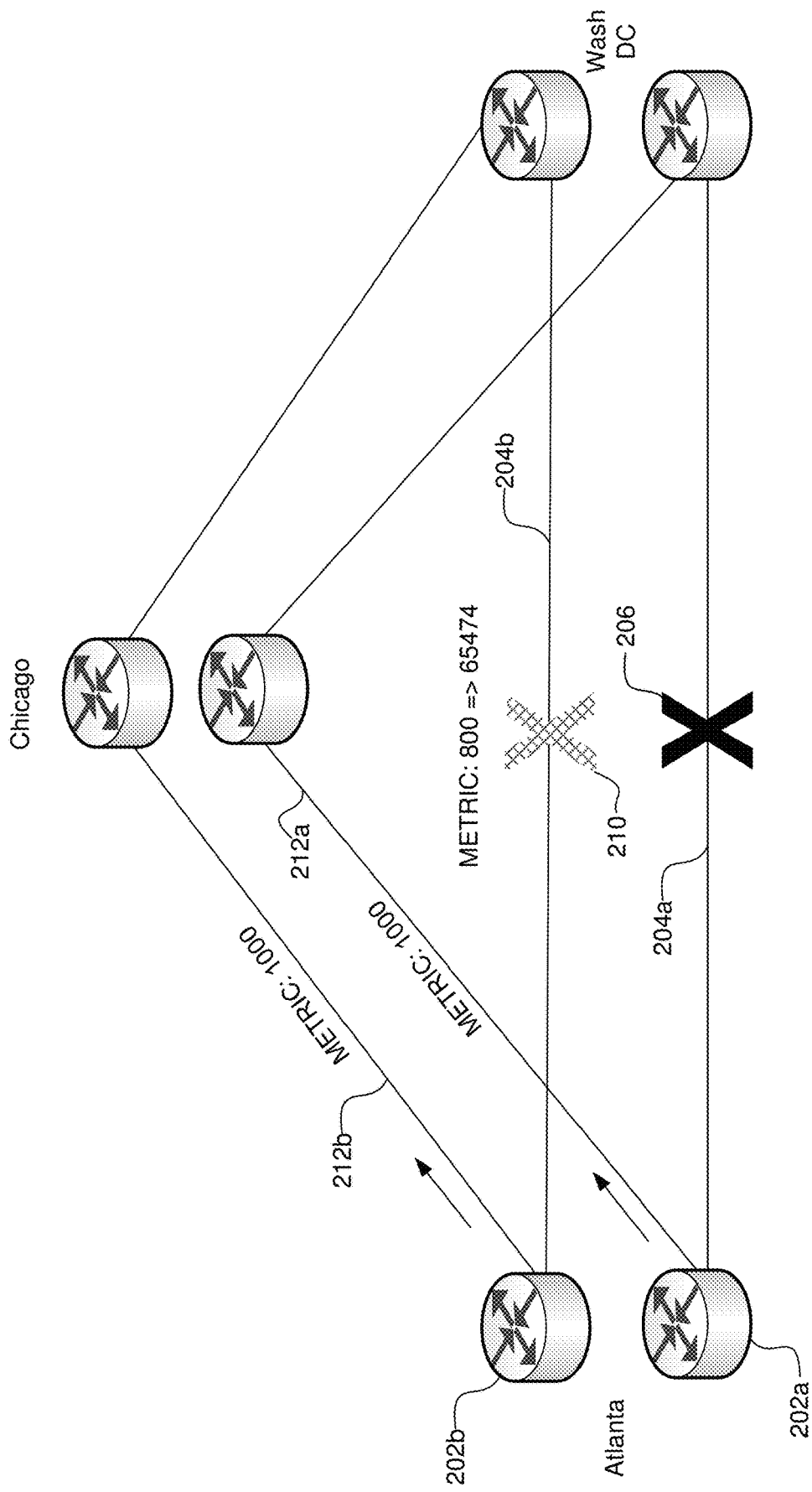
FIG. 2 is a network diagram illustrating an example parallel link configuration and an associated scenario.

FIG. 2 illustrates example parallel link configurations between Atlanta and Washington D.C., Atlanta and Chicago, and Chicago and Washington D.C. If a link fails in any of the parallel link configurations, traffic that normally would have been transmitted on the failed link can be transmitted over the other link in the parallel link configuration. However, the other (operational) link in the parallel link configuration may be overwhelmed with the excess traffic, causing delayed or failed transmissions, or other communication problems. It may be better to transmit the traffic of one parallel link configuration having one or more failed links over an alternative route, for example, the next lowest cost route.

In one embodiment, routers are configured such that, if one or more links fail in a parallel link configuration, the routers may make other links in the configuration appear to be effectively failed. When it is determined that a certain number of links have failed in the parallel link configuration, routers in the configuration set the metric of the other links (that haven't failed) at an artificially high cost. In so doing, data will not be transmitted over links having an artificially high cost, but rather routed via other links.

Referring again to the example scenario shown in FIG. 2, under normal operation, routers 202a and 202b in Atlanta advertise a cost for links 204a and 204b, respectively, which represents the actual cost of the links 204a and 204b when they are operational. For example, under the Open Shortest Path First (OSPF) protocol, the actual cost of links 204a and 204b may be 800. Embodiments are also applicable to environments that use the ISIS protocol. The actual cost is typically provisioned onto the routers when the routers are configured for operation.

In the example scenario of FIG. 2, a link 204a between Atlanta and Washington D.C. has failed, as depicted by the large solid "X" 206 over the link 204a. The link failure 206 may occur for any number of reasons, such as, but not limited to, a cut fiber bundle or mis-configuration of the link 202a. The failure 206 renders the link 202a inoperative or inactive for carrying communication traffic between Atlanta and Washington D.C. via router 202a. Router 202a detects the link failure 206 and discontinues advertising the metric associated with the link 204a. By discontinuing advertising of the metric of link 204a, the router 202a notifies other routers, such as 202b, 208a and 208b that link 204a has failed.

Fate sharing refers to a process of creating and artificial appearance of failure in operational links in a parallel link configuration so that traffic volume over the operational links corresponds to traffic volume over inoperative links in the parallel configuration. Embodiments described herein alter traffic flow in operational links of a parallel link configuration using the Interior Gateway Protocol (IGP). According to these embodiments, routers that are part of a parallel link configuration adjust metric costs of operational links when specified number of links in the parallel link configuration become inactive.

Referring to the scenario depicted in FIG. 2, after link 204a fails, router 202b can determine that link 204a has failed because router 202a will stop advertising a metric for link 204a. When router 202b determines that link 204a has failed, router 202b adjusts the metric cost of link 204b to alter traffic flow across link 202b. According to some embodiments, the router 202b sets the metric cost of link 204b to an artificially high value to create an artificial failure 210 (shown by cross-hatched "X"). The artificially high value is chosen to be higher than metric costs of other links connected to routers 202a and 202b. The artificial failure 210 is not an actual failure because link 204b is still active and operational; however, artificial failure 210 has the effect of simulating a failure condition, thereby preventing (or diminishing) traffic flow across link 204b. As a result, other links, such as link 212a and 212b, which are connected to routers 202a and 202b will be used to route traffic to Atlanta, instead of link 204b.

In accordance with one embodiment, the artificially high metric is a function of a minimum number of links that must be operational in the parallel link configuration. The function may take the following general form:

$$\text{Adjusted Cost} = \text{Max Cost} - \text{Adjustment Value} \quad (1)$$

$$\text{Adjustment Value} = \text{Base Adj Value} - \text{Min Req'd Active Links} \quad (2)$$

In the foregoing equations, the Adjusted Cost is the cost that a metric of an operational link will be set to when the minimum number of links are not operational in a parallel link configuration. The Max Cost is the maximum cost that a link metric can take on, according to the protocol being used (e.g., OSPF or ISIS). Adjustment Value is a value used for adjusting the metric. In one embodiment, Adjustment Value is a function of the specified minimum number of active links. In one embodiment, Adjustment Value is determined from the function shown in equation (2).

The Base Adj Value is a base adjustment value, which can be selected in an arbitrary fashion or selected based on the Max Cost or on some other basis. Base Adj Value is typically larger than Min Req'd Active Links. In one embodiment, the Base Adj Value is selected to be large enough to cover any reasonable number of equal cost paths (e.g., 32) but not large enough to impact metric values that might be in use for other reasons. For example, assume 60,000 is a "high" cost that is commonly used to divert traffic off a link (e.g., for testing or other purposes). If Base Adj Value is 10000, the value of 60,000 would fall in the affected range of metrics that are being used for signaling. In a very worst case scenario there might be, for example, 9,999 equal cost links. As such, a Base Adj Value of 10,000 would probably be too high because an adjustment of the metric with this value could adversely impact decision making based on other selected metric costs, but it is unnecessarily high for purposes of covering a reasonable number of equal cost links.

The Min Req'd Active Links value represents the minimum number of active (operational) links that are required to maintain the active link metric at the actual cost.

To illustrate, assuming the parallel link configuration of FIG. 2 and assuming OSPF is being employed by the routers 202a and 202b, the following values may be used to determine the Adjusted Cost:

$$\text{Max Cost} = 65{,}535 \quad (3)$$

$$\text{Base Adj Value} = 63 \quad (4)$$

$$\text{Min Req'd Active Links} = 2 \quad (5)$$

Using the above assigned numbers, when router 202b determines that link 202a has failed, router 202b determines that fewer than the minimum number of required active links are active. Specifically, the minimum number of required active links is 2, but only 1 link is currently active after link 202a fails. In response to the determined less than 2 required active links, router 202b sets the metric of link 202b to an adjusted cost (e.g., artificially high cost). Using equations (1)-(5) above, the adjusted metric for link 202b is 65,474.

The routers in parallel link configurations are configured with information for carrying out the fate sharing process. In addition, a staged recovery process is generally carried out to coordinate the routers' re-entry into normal operation, either upon startup or after an actual link failure. Router configuration and staged recovery are discussed in detail below with reference to FIGS. 3-5.

FIG. 3 illustrates a parallel link configuration 300 with four routers 302 at each end of the links 304. In this example, one end is in Atlanta and the other end is in Washington D.C. Prefixes are shown in association with router ports. For example, Atlanta router 302a is associated with prefix 1.1.1.1, Washington D.C. router 302e is associated with prefix 1.1.1.2, and so on. The routers 302 are configured with parameters of the parallel link configuration. These parallel link configuration parameters are in addition to other configuration parameters that are traditionally stored in the routers 302. To illustrate how a router in a parallel link configuration may be configured, the following example configuration parameters may be stored on Atlanta router 302a:

interface portchannel 1
    description WDC link
    ip address 1.1.1.1/30
    ip ospf cost 800
    minimum-bundles 3
    candidate-bundles prefix-list wdc-bundles
    ip prefix-list wdc-bundles
    seq 5 permit 1.1.1.0/30
    seq 10 permit 1.1.1.4/30
    seq 15 permit 1.1.1.8/30
    seq 20 permit 1.1.1.12/30

In the above parameters, "minimum-bundles 3" and "candidate-bundles prefix-list wdc-bundles" represent a new syntax and information relevant to parallel link configurations. The parameter "minimum-bundles 3" specifies the minimum number of links that must be active (operational) in order to advertise the actual cost of the WDC link. In this case, the minimum number of links is 3. The parameter "candidate-bundles prefix-list wdc-bundles" identifies prefix ranges included in the parallel link configuration. As shown in the configuration parameters, the prefix ranges are specified by "seq 5 permit 1.1.1.0/30", "seq 10 permit 1.1.1.4/30", "seq 15 permit 1.1.1.8/30", "seq 20 permit 1.1.1.12/30". The prefix ranges identify the links in the parallel link configuration.

The configuration indicated above differs syntactically from FIG. 3 to distinguish between the configuration on the router—e.g. 1.1.1.1—and the prefix that is advertised—1.1.1.0/30. As will be understood by those skilled in the art, the route covers everything in the LAN (or subnet) range. If a router-to-router link is configured as 1.1.1.0/30 then one end will have address 1.1.1.1 and the other end will have address 1.1.1.2. The top address is the "broadcast" address—1.1.1.3 in this case, and the lowest (1.1.1.0) is the "network address. A /30 range only has four addresses (32 bits in binary, with 30 held constant, gives 00, 01, 10 and 11 as possible binary numbers).

Configured with the above parameters, Atlanta router 302a is programmed to monitor status of links 304 in the parallel link configuration 300. When 2 or more links 304 have an actual failure, Atlanta router 302a carries out the fate sharing process, wherein the metric of router's 302a link 304a (the link between router 302a and 302e) is set to an artificially high value. Setting the link 304a metric to an artificially high value creates the effect of an artificial failure on the link 304a, even though the link is operational.

Continuing with the example, the metric cost will be adjusted from 800 to some adjusted cost. In one embodiment the adjusted cost is the maximum cost minus a base adjustment value plus the minimum number of required active links. Assuming OSPF is used and the base adjustment value is 63, the adjusted cost is:

$$\text{Adjusted Cost}=65{,}535-63+3=65{,}475 \tag{6}$$

In the scenario of FIG. 3, when the routers 302 determine that fewer than three links 304 are active, the routers 302 connected to the remaining operational links will set the metrics of the operational links to 65,475 and advertise the adjusted metric. The routers 302 connected to operational links will continue to advertise the adjusted metric until three or more links 304 become active again.

When an actually failed link reactivates, the router 302 attached to the reactivated link goes through a staged recovery process. In the staged recovery process, the attached router 302 does not begin advertising the actual cost (e.g., 800 in this case), but rather first advertises the artificially high cost (e.g., 65,475 in this case) and monitors the status of other links in the parallel link configuration. In the staged recovery process, the router 302 does not advertise the actual cost until it determines that the specified minimum number of links are active (and the router's own link has not actually failed).

Figure 5:
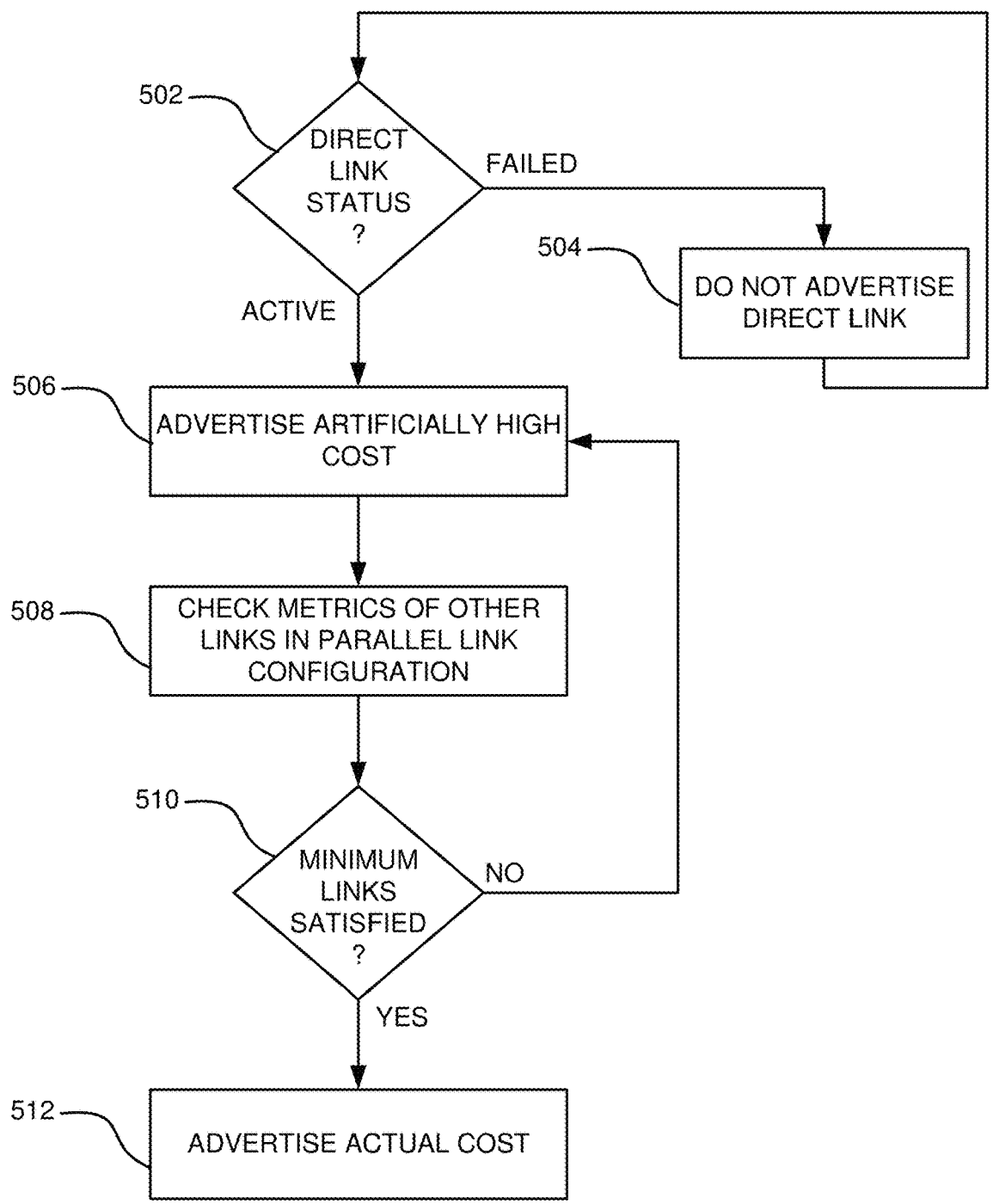
FIG. 5 is a flowchart illustrating an example staged recovery algorithm in accordance with one embodiment.

It should be noted that links for which the artificially high cost is being advertised are active links. Therefore, during the staged recovery process links that are being advertised at the artificially high cost are recognized as active, rather than actually failed, links. An exemplary staged recovery process is shown in FIG. 5 and described further below. The staged recovery process is carried out by all routers 302 in the parallel link configuration 300 upon startup. It is to be understood that the particular numerical values shown and discussed above are for illustrative purposes and are not intended to limit embodiments to those particular values. Those skilled in the art will be able to determine values associated with the parameters discussed herein that are within the scope of the invention and provide functionality and advantages discussed with regard to the shown embodiments.

Figure 4:
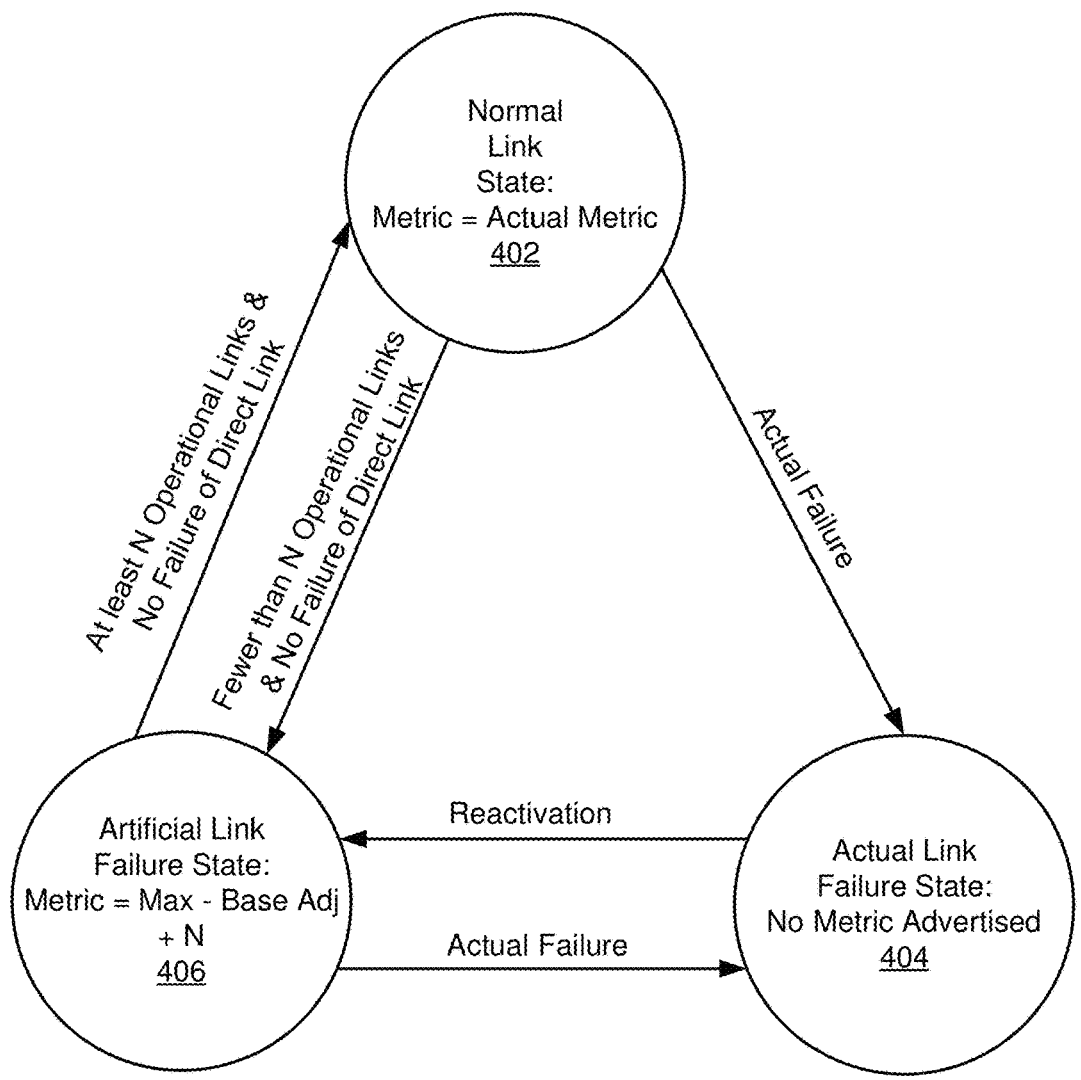
FIG. 4 is a state diagram illustrating operating states that a router can enter when configured in accordance with various embodiments.

FIG. 4 is a state diagram illustrating a state machine 400 that a router can execute, according to one embodiment. The state machine 400 includes three states: a normal link state 402, an actual link failure state 404 and an artificial link failure state 406.

The router starts in the artificial failure state 406. In the artificial failure state 406, the link connected to the router is operational (i.e., not actually failed), and an artificially high metric cost is advertised. In one embodiment, the artificially high link cost is a function of a maximum cost and an adjustment value. The adjustment value can be a function of a minimum number (N) of links that are specified to be operational for normal operation. In these embodiments, the artificially high metric cost may be computed using one or more of the equations (1)-(5) shown and discussed above. The router may be configured with the artificially high cost and/or the router may perform real-time computation of the artificially high metric.

While in the artificial failure state 406, the router checks the status of the links in the parallel link configuration. The router continues to advertise the artificially high cost for its link (i.e., the link connected to the router in the parallel link configuration) until either at least the N operational links are operational (i.e., not actually failed) or the router's link actually fails. If the router's link fails, the router enters the actual link failure state. If the router's link is operational and N total links are operational in the parallel link configuration, the router enters the normal link state.

In the normal link state 402, the router advertises the actual cost for the router's link. Typically, the actual link cost is configured into the router and can be read from memory. While in the normal link state 402 the router continues to monitor the status of links in the parallel link configuration. If the router's link is operational, but fewer than N links in the parallel link configuration are operational, the router enters the artificial failure state 406. If an actual link failure of the router's link is detected in the normal link state 402, the router enters the actual link failure state 404.

While in the actual link failure state 404, the metric for the router's link is not advertised. The router continues to monitor status of the links in the parallel link configuration. If the router's link reactivates (becomes operational again), the router enters the artificial link failure state 406.

FIG. 5 is a flowchart illustrating a staged recovery algorithm 500 according to one embodiment. The algorithm 500 is performed by a router in a parallel link configuration on start up and after reactivation of a previously failed link. In the processes shown in FIGS. 5-7, it is assumed the routers are provisioned with configuration parameters such as those shown above. Initially, a query operation 502 checks the status of the link directly connected to the router performing the algorithm 500. If the link is inoperative (i.e., actually failed), the algorithm 500 branches "FAILED" to operation 504, which is actually a non-operation, wherein the link metric is not advertised. Operation 504 is illustrated merely to emphasize that the link metric of the failed link is not advertised. The algorithm 500 returns to operation 502 to again check the status of the directly connected link.

If and when the status of the directly connected link is determined to be operational, the algorithm 500 branches "ACTIVE" to an advertising operation 506 sets the link metric to the artificially high cost and advertises the artificially high cost for the link connected to the router in the parallel link configuration. A checking operation 508 monitors advertised costs of other links in the parallel link configuration.

A querying operation 510 determines whether the minimum number of links are active in the parallel link configuration. In one embodiment, a link is determined to be failed (i.e., inactive or inoperative) if the link is not being advertised. A link is not failed if a metric is being advertised for the link, even if the metric value is the artificially high metric value. If the minimum number of links are not active, the process 500 branches "NO" back to advertising operation 506 and continues to advertise the artificially high cost. On the other hand, if it is determined that at least the minimum number of links are active, the algorithm 500 branches "YES" to another advertising operation 512, where the actual cost is advertised.

Figure 6:
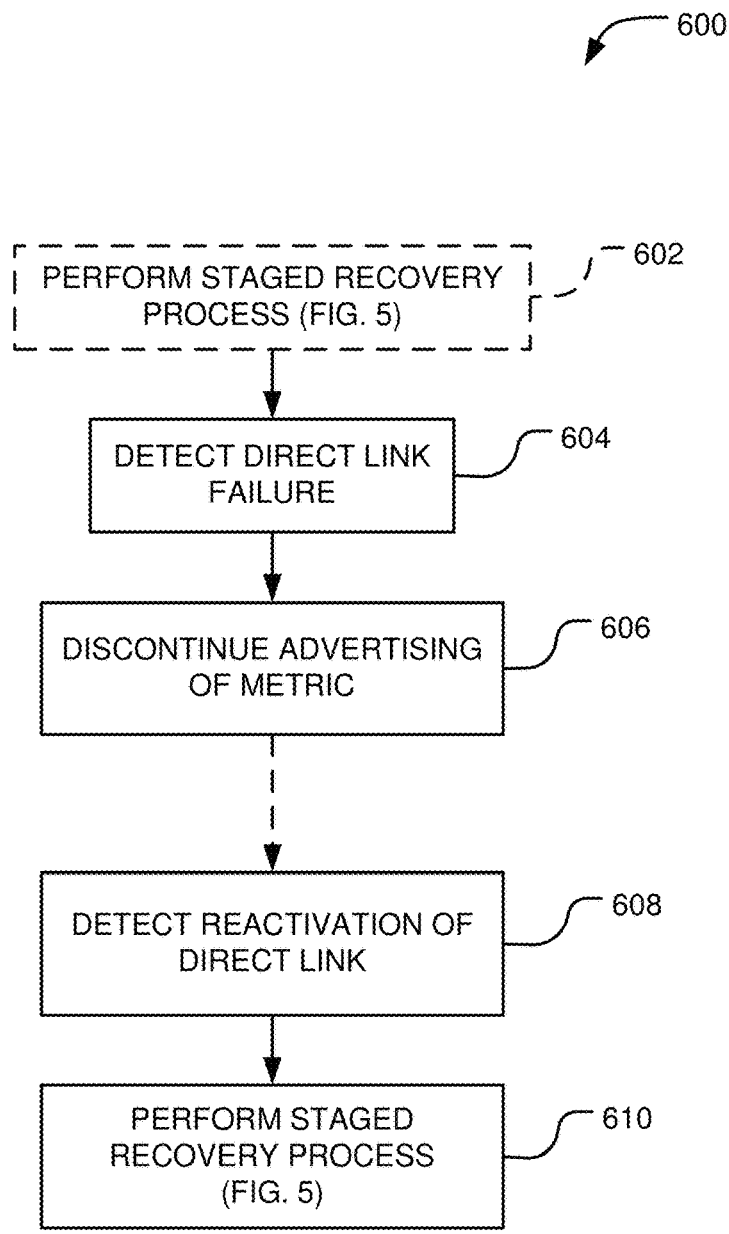
FIG. 6 is a flowchart illustrating an example direct link failure and recovery detection process in accordance with one embodiment.

FIG. 6 is a flowchart illustrating a direct link failure algorithm 600 carried out by a router in a parallel link configuration when a link that is directly connect to the router in the configuration fails. In other words, the algorithm 600 is performed by a router when its own link in the parallel link configuration fails. The algorithm 600 can be entered from any state. For example, the direct link may fail when the router is advertising the actual cost or when the router is advertising the artificially high cost.

Initially, it is assumed that prior to the link failure, the router has performed 602 the staged recovery shown in FIG. 5, although this may not necessarily be the case. For example, the router may not make it completely through the staged recovery before detecting a link failure. After startup or the staged recovery process 602, a detecting operation 604 detects failure of the directly connected link in the parallel link configuration. In response to detecting the failure, a discontinuing operation 606 stops advertising the metric for the failed link. After some amount of time, another detecting operation 608 detects reactivation of the previously failed link. Another performing operation 612 performs the staged recovery process shown in FIG. 5.

Figure 7:
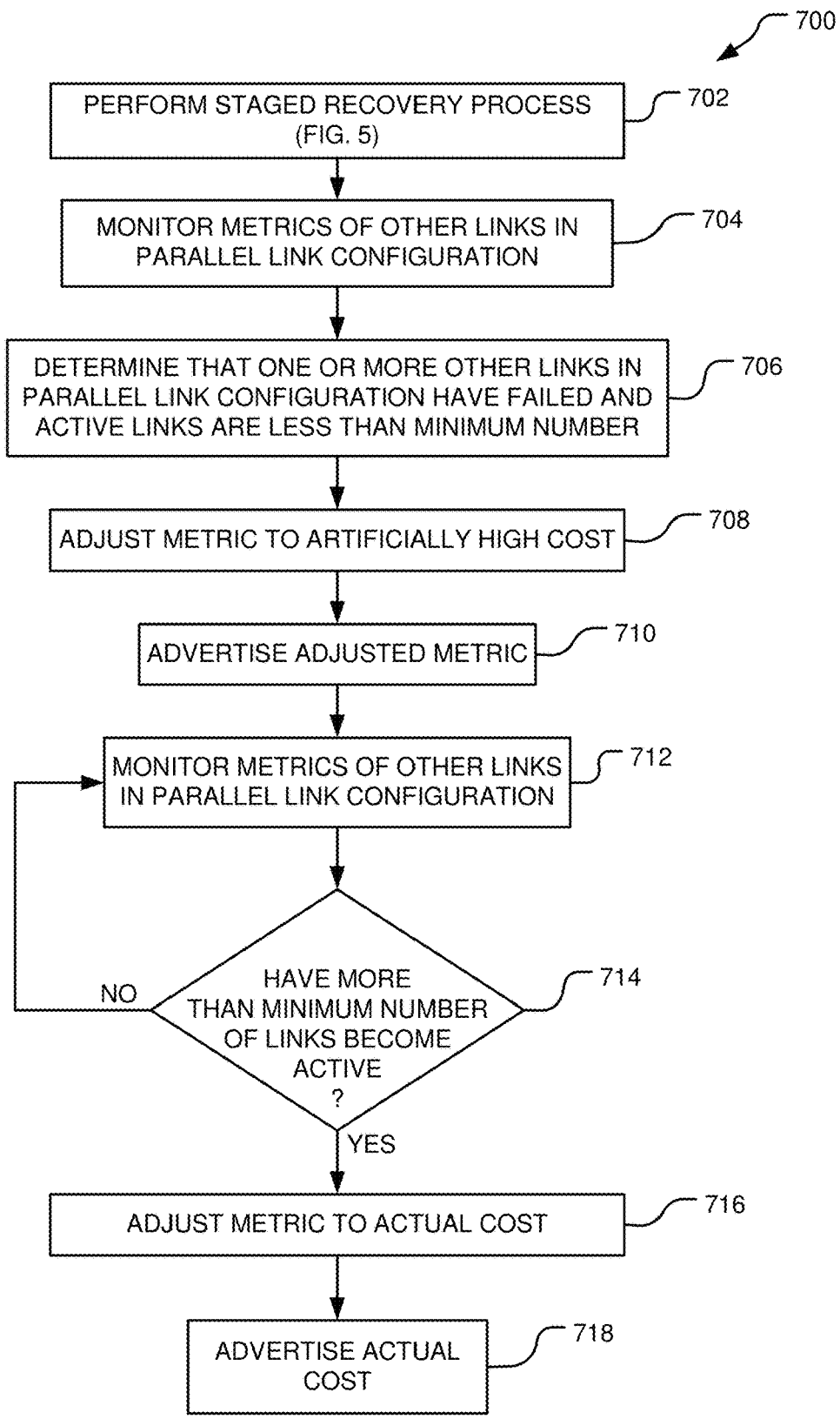
FIG. 7 is a flowchart illustrating an example fate sharing process that can be carried out by a router in a parallel link configuration in accordance with one embodiment.

FIG. 7 is a flowchart illustrating a fate sharing algorithm 700 that can be carried out by a router in a parallel link configuration. Initially, it is assumed that the staged recovery process of FIG. 5 is performed and the router is advertising the actual cost for the direct link. A monitoring operation 704 monitors for metrics being advertised (or not being advertised) from other routers in the parallel link configuration. As long as the minimum number of links are being advertised, the algorithm 704 continues to advertise the actual cost.

At some point, a determining operation 706 determines that fewer than the minimum number of links are active. The determining operation 706 determines that a link is not active if its link metric is not advertised. An adjusting operation 708 adjusts the cost of the metric of the direct link to the artificially high value. In one embodiment, adjusting operation 708 sets the metric equal to a value that is a function of the maximum allowed cost and an adjustment value. In one embodiment the adjustment value is a function of a base adjustment value and the specified minimum number of required active links. Equations (1)-(2) shown above are one example of functions that can be used by the adjusting operation. In some embodiments, the router does not actually perform the computations of equations (1)-(2). Instead, the adjustment value can be provisioned on the router when the router is configured.

In an advertising operation 710, the adjusted cost is advertised instead of the actual cost. In a monitoring operation 712, the router again monitors advertisement (or non-advertisement) of other links in the parallel link configuration. A querying operation 714 determines whether the specified minimum number of active links are present in the parallel link configuration. If not, the algorithm 700 branches "NO" back to monitoring operation 712, where the other links continue to be monitored. If and when the minimum number of links become active, the querying operation 710 branches "YES" to another adjusting operation 716, where the metric of the directly connected link is readjusted to the actual cost. Another advertising operation 718 then advertises the readjusted metric at the actual cost.

Figure 8:
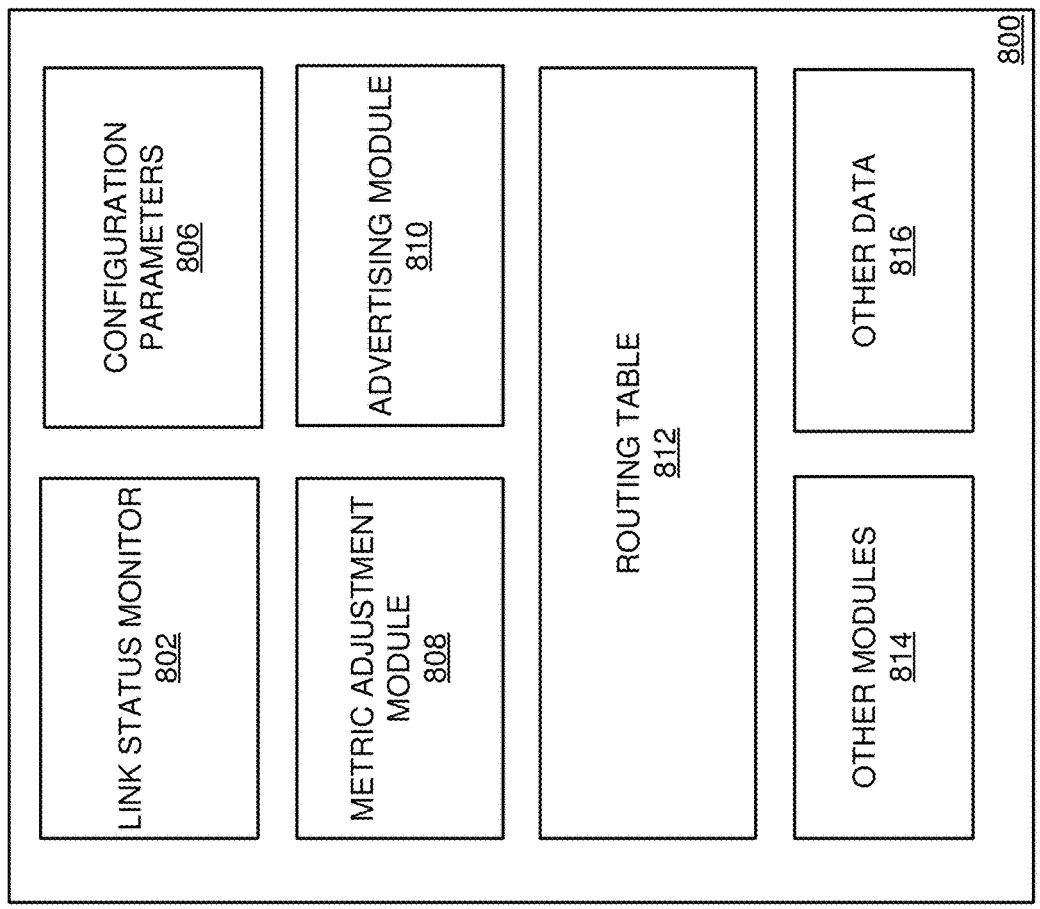
FIG. 8 is a functional module diagram illustrating example functional modules and data of a router in accordance with one embodiment.

FIG. 8 is a functional module diagram illustrating a router 800 having functional modules and data in accordance with various embodiments. Although a router typically will include other modules and data than those shown in FIG. 8, example modules and data are shown that are most relevant to fate sharing processes that can be carried out by a router in a parallel link configuration. The modules can be made up of hardware, software, firmware or any combination thereof. In one particular embodiment modules include memory storing processor executable instructions and data, and a processor that executes the instructions to carry out processes associated with fate sharing.

A link status monitor 802 monitors the status of links in the parallel link configuration, including link(s) connected directly to the router 800 and indirect links, which are links connected to other routers in the parallel link configuration. The links may be failed (inactive, inoperative) or operational (e.g., active). Generally if a metric is advertised in association with a link, the link is operational.

The link status monitor 802 receives information about links in the parallel link configuration and outputs signals or data indicative of link status. The link status module 802 receives (e.g., reads from memory) metrics advertised by other routers in the parallel link configuration and uses parallel link configuration parameters in configuration data 806 to make the relevant determinations and output data. In one embodiment, the link status monitor 802 indicates if fewer than the required number of links are operational and whether the direct link(s) is failed. The configuration data 806 is discussed further below.

A metric adjustment module 808 sets and adjusts the metric(s) associated with directly connected links based on outputs from the link status monitor 802. The metric adjustment module 808 uses parallel link configuration parameters in the configuration data 806 to determine how to adjust or set the metric(s). In one embodiment, the metric adjustment module 808 sets a direct link metric to an actual cost under normal operating conditions but sets the direct link metric to an artificially high cost when fewer than a specified number of links in the parallel link configuration are operational.

An embodiment of the metric adjustment module 808 carries out a staged recovery process. Upon startup and after reactivation of a failed link, the metric adjustment module 808 initially sets the link metric to the artificially high cost and maintains the metric at the artificially high cost until the minimum number of required links are operational in the parallel link configuration.

An advertising module 810 receives the cost from the metric adjustment module 808 and advertises the direct link metric(s) when the direct link is operational. In one embodiment, the advertising module 810 advertises according to the Interior Gateway Protocol (IGP). The configuration data 806 includes parameters relevant to one or more parallel link configurations that the router 800 is part of. Example parameters are shown above. In general, the parallel link configuration parameters identify the routers and links in the parallel link configuration, a minimum number of links required to advertise the actual cost of the direct link, and an artificially high cost to be advertised when fewer than the required number of links are operational (assuming the direct link is operational).

The router 800 also includes a routing table 812 for use in forwarding packets. The router 800 may also include other functional modules 814 and other data 816.

Figure 9:
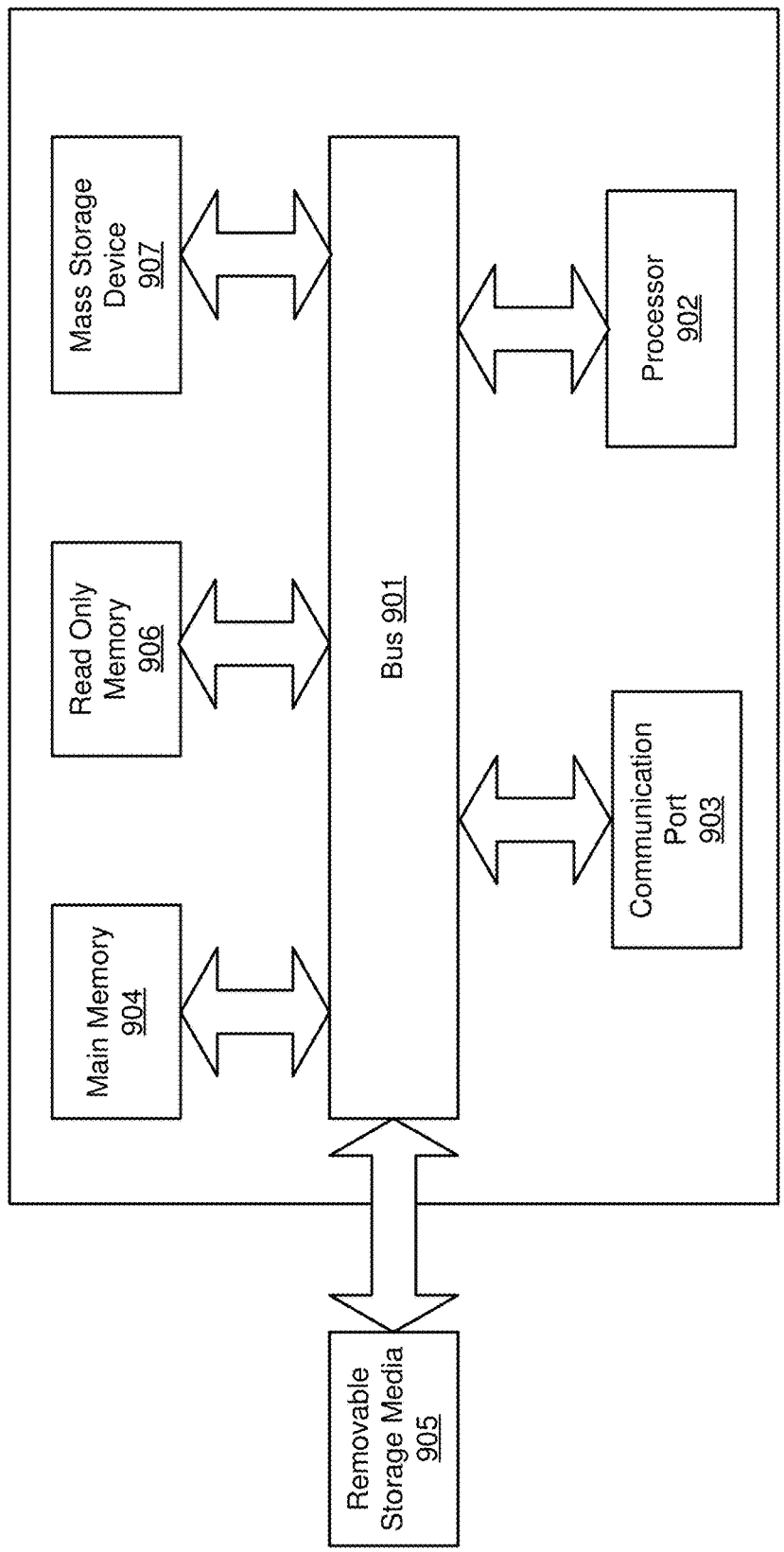
FIG. 9 is a schematic diagram of a general purpose computing system that may be implemented as a router or a computing device for configuring a router.

FIG. 9 is a schematic diagram of a computing device 900 upon which embodiments of the present invention may be implemented and carried out. For example, one or more computing devices 900 may be used to configure a router, or the components of the computing device 900 may comprise a router operable to perform the fate sharing functions described herein. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 900 includes a bus 901, at least one processor 902, at least one communication port 903, a main memory 904, a removable storage media 905, a read only memory 906, and a mass storage 907. Processor(s) 902 can be any know processor, such as, but not limited to, an Intel® Itanium® or Itanium 2® processor(s), AMD® Opteron® or Athlon MP® processor(s), or Motorola ® lines of processors. Communication port(s) 903 can be any of an RS-232 port for use with a modem based dialup connection, a 10/100 Ethernet port, a Gigabit port using copper or fiber, or a USB port. Communication port(s) 903 may be chosen depending on a network such a Local Area Network (LAN), Wide Area Network (WAN), or any network to which the computing device 900 connects. The computing device 900 may be in communication with peripheral devices (not shown) such as, but not limited to, printers, speakers, cameras, microphones, or scanners.

Main memory 904 can be Random Access Memory (RAM), or any other dynamic storage device(s) commonly known in the art. Read only memory 906 can be any static storage device(s) such as Programmable Read Only Memory (PROM) chips for storing static information such as instructions for processor 902. Mass storage 907 can be used to store information and instructions. For example, hard disks such as the Adaptec® family of SCSI drives, an optical disc, an array of disks such as RAID, such as the Adaptec family of RAID drives, or any other mass storage devices may be used.

Bus 901 communicatively couples processor(s) 902 with the other memory, storage and communication blocks. Bus 901 can be a PCI/PCI-X, SCSI, or USB based system bus (or other) depending on the storage devices used. Removable storage media 905 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Although various embodiments of this invention have been described above with a certain degree of particularity, or with reference to one or more individual embodiments, those skilled in the art could make numerous alterations to the disclosed embodiments without departing from the spirit or scope of this invention. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method for routing communication traffic in a network, the method comprising:
    detecting, by one or more processors, that a link from among a plurality of links in a parallel link configuration has failed while one or more other links from among the plurality of links are operational;
    in response to detecting that the link in the parallel link configuration has failed, determining that a number of the one or more other links from among the plurality of links that are operational is less than a minimum number of operational links required to advertise actual cost metrics of each of the one or more other links that are operational;
    adjusting, by the one or more processors, one or more metrics associated with the one or more other links in the parallel link configuration to indicate that none of the links from among the plurality of links in the parallel configuration are available in response to determining that the number of links that are operational is less than the required minimum number of operational links; and
    propagating, by the one or more processors, the adjusted one or more metrics throughout the network,
    wherein adjusting the one or more metrics comprises increasing, by the one or more processors, the one or more metrics to one or more high values, respectively, indicative of a link failure, and
    wherein adjusting the one or more metrics further comprises setting, by the one or more processors, the one or more metrics to one or more respective values that reduce the probability of routing communication traffic over each of the plurality of links to less than a threshold probability.

2. The method as recited in claim 1, wherein propagating the adjusted one or more metrics comprises advertising the adjusted one or more metrics according to an Interior Gateway Protocol.

3. A router connected to a first link in a parallel link configuration including one or more other routers and one or more other links, the router comprising:
    one or more processors; and
    memory communicably coupled to the one or more processors, storing configuration parameters specifying a minimum number of links required to be operational in the parallel link configuration and a high cost indicative of a link failure, and further storing instructions that, when executed by the one or more processors, cause the one or more processors to:
    detect a failure of a link from among the first link and the one or more other links in the parallel link configuration;
    in response to detecting the failure, determine that a number of operational links from among the first link and the one or more other links in the parallel link configuration is less than the minimum number of required links;
    set a first link metric of the first link to the high cost until the minimum number of required links are operational after startup of the router or failure and reactivation of the first link; and
    advertise the first link metric,
    wherein the configuration parameters further specify an actual cost of the first link, and wherein the one or more processors is further operable to set the first link metric to the actual cost when the number of operational links becomes greater than or equal to the minimum number of required links.

* * * * *